No. 681,655. Patented Aug. 27, 1901.
H. D. PERKY.
CONTINUOUS HEATING AND BAKING MACHINE.
(Application filed Sept. 29, 1900.)

(No Model.) 5 Sheets—Sheet 1.

ATTEST- INVENTOR.
Harry L. Amer. Henry D. Perky.
Geo. M. Anderson By E. W. Anderson
his Atty.

No. 681,655. Patented Aug. 27, 1901.
H. D. PERKY.
CONTINUOUS HEATING AND BAKING MACHINE.
(Application filed Sept. 29, 1900.)

(No Model.) 5 Sheets—Sheet 2.

ATTEST- INVENTOR.
Harry L. Amer. Henry D. Perky.
Geo. M. Anderson By E. W. Anderson
his Atty.

THE NORRIS PETERS CO., PHOTO-LITHO., WASHINGTON, D. C.

No. 681,655. Patented Aug. 27, 1901.
H. D. PERKY.
CONTINUOUS HEATING AND BAKING MACHINE.
(Application filed Sept. 29, 1900.)
(No Model.) 5 Sheets—Sheet 3.
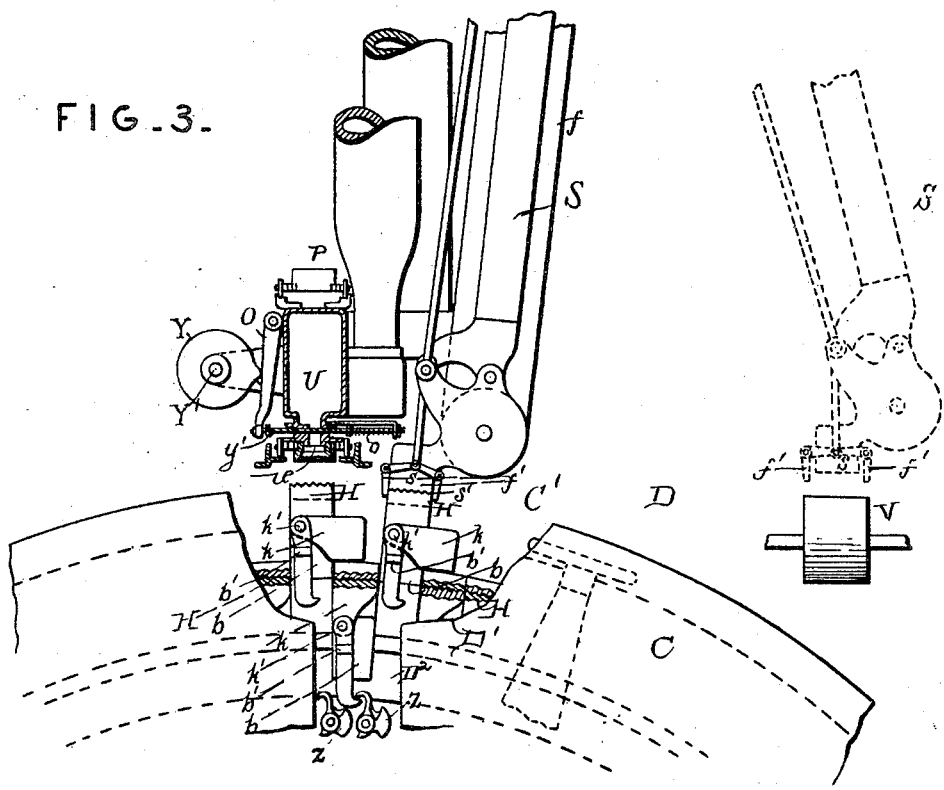
FIG. 3.
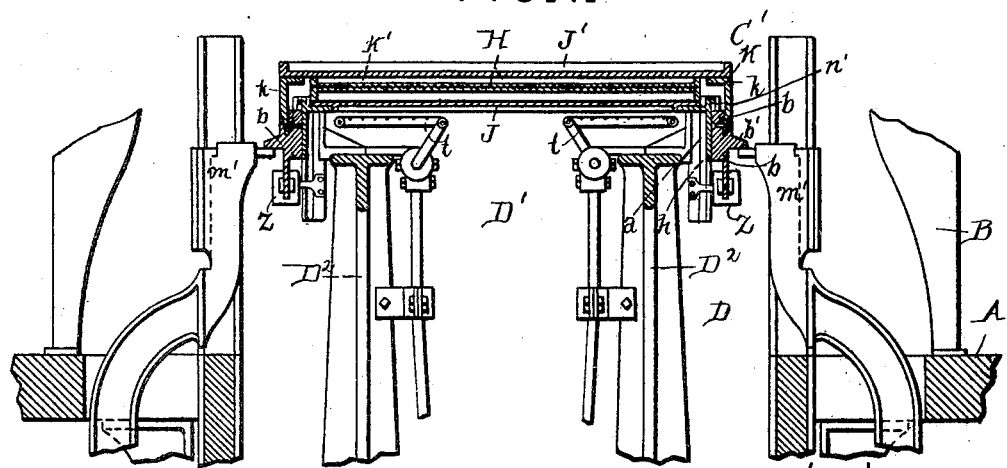
FIG. 4.
FIG. 9.
ATTEST.
Harry L. Amer.
George M. Anderson
INVENTOR.
Henry D. Perky.
By E. W. Anderson
his Atty.

No. 681,655. Patented Aug. 27, 1901.
H. D. PERKY.
CONTINUOUS HEATING AND BAKING MACHINE.
(Application filed Sept. 29, 1900.)
(No Model.) 5 Sheets—Sheet 4.
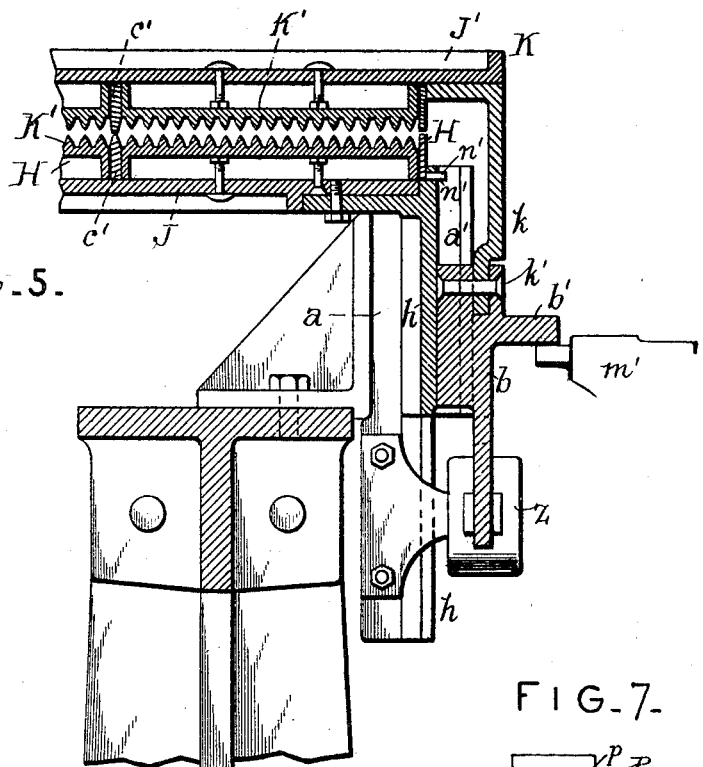
FIG. 5.
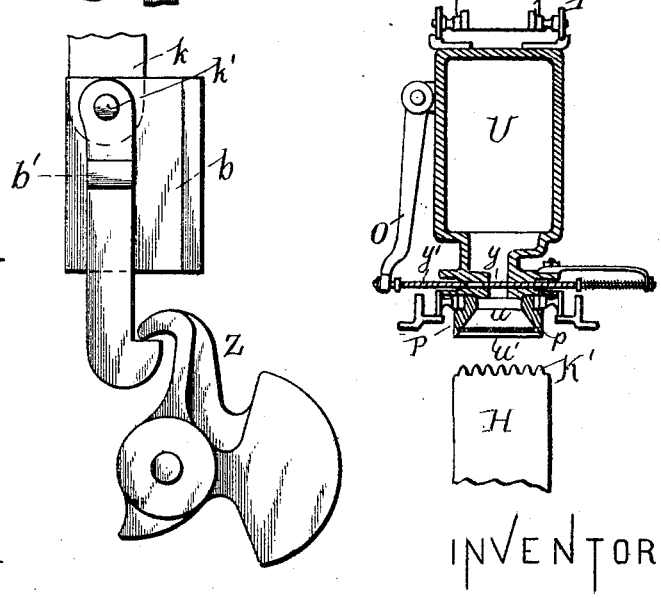
FIG. 6.
FIG. 7.
ATTEST-
Harry L. Amer
George M. Anderson
INVENTOR-
Henry D. Perky.
By E. W. Anderson
his Atty.

No. 681,655. Patented Aug. 27, 1901.
H. D. PERKY.
CONTINUOUS HEATING AND BAKING MACHINE.
(Application filed Sept. 29, 1900.)
(No Model.) 5 Sheets—Sheet 5.

Witnesses
George M. Anderson
Nellie G. McCarthy

Inventor
Henry D. Perky
By C. W. Anderson
his Attorney

UNITED STATES PATENT OFFICE.

HENRY D. PERKY, OF WORCESTER, MASSACHUSETTS.

CONTINUOUS HEATING AND BAKING MACHINE.

SPECIFICATION forming part of Letters Patent No. 681,655, dated August 27, 1901.

Application filed September 29, 1900. Serial No. 31,555. (No model.)

*To all whom it may concern:*

Be it known that I, HENRY D. PERKY, a citizen of the United States, and a resident of Worcester, in the county of Worcester and State of Massachusetts, have made a certain new and useful Invention in Continuous Heating and Baking Machines; and I declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
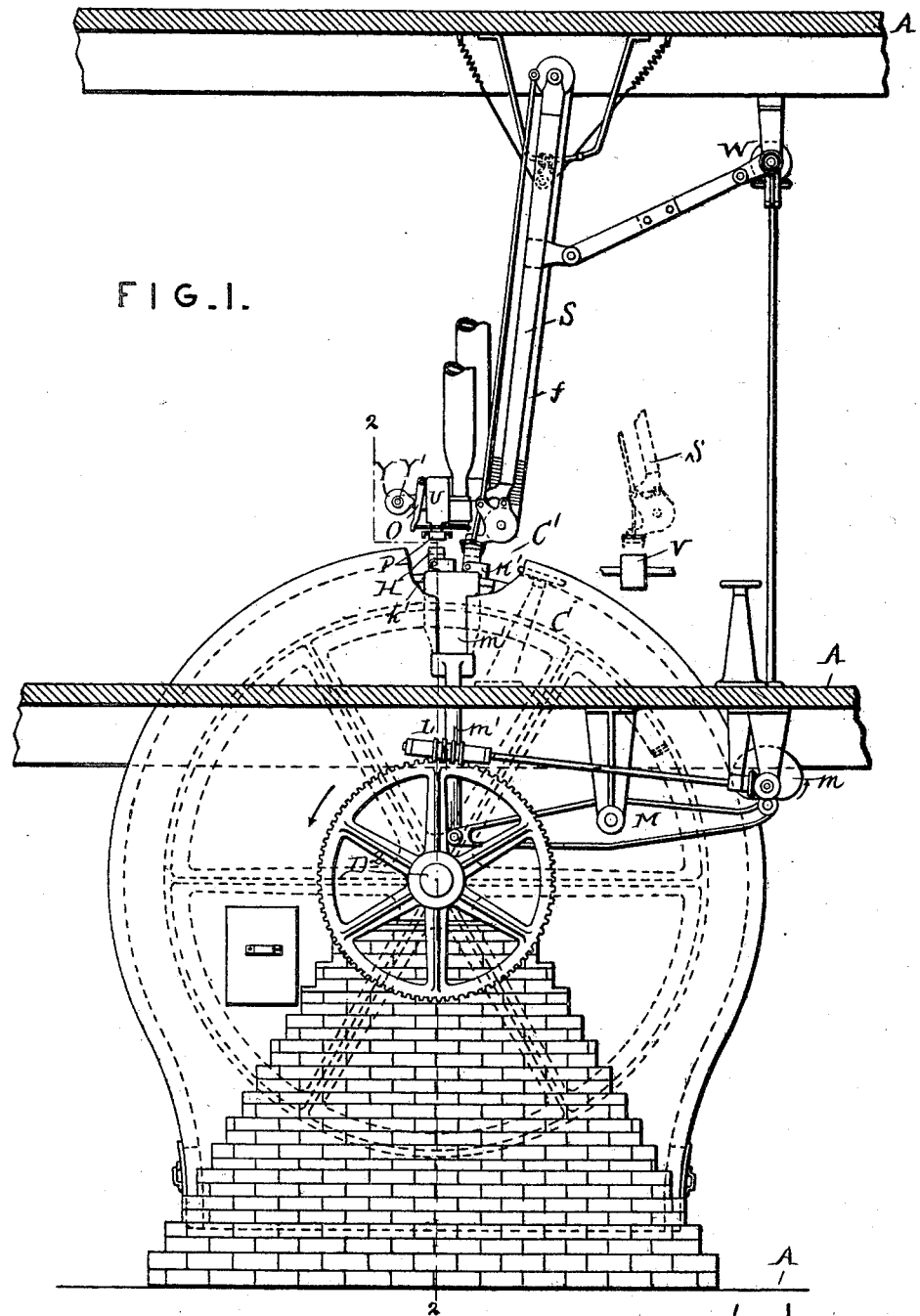
Figure 2:
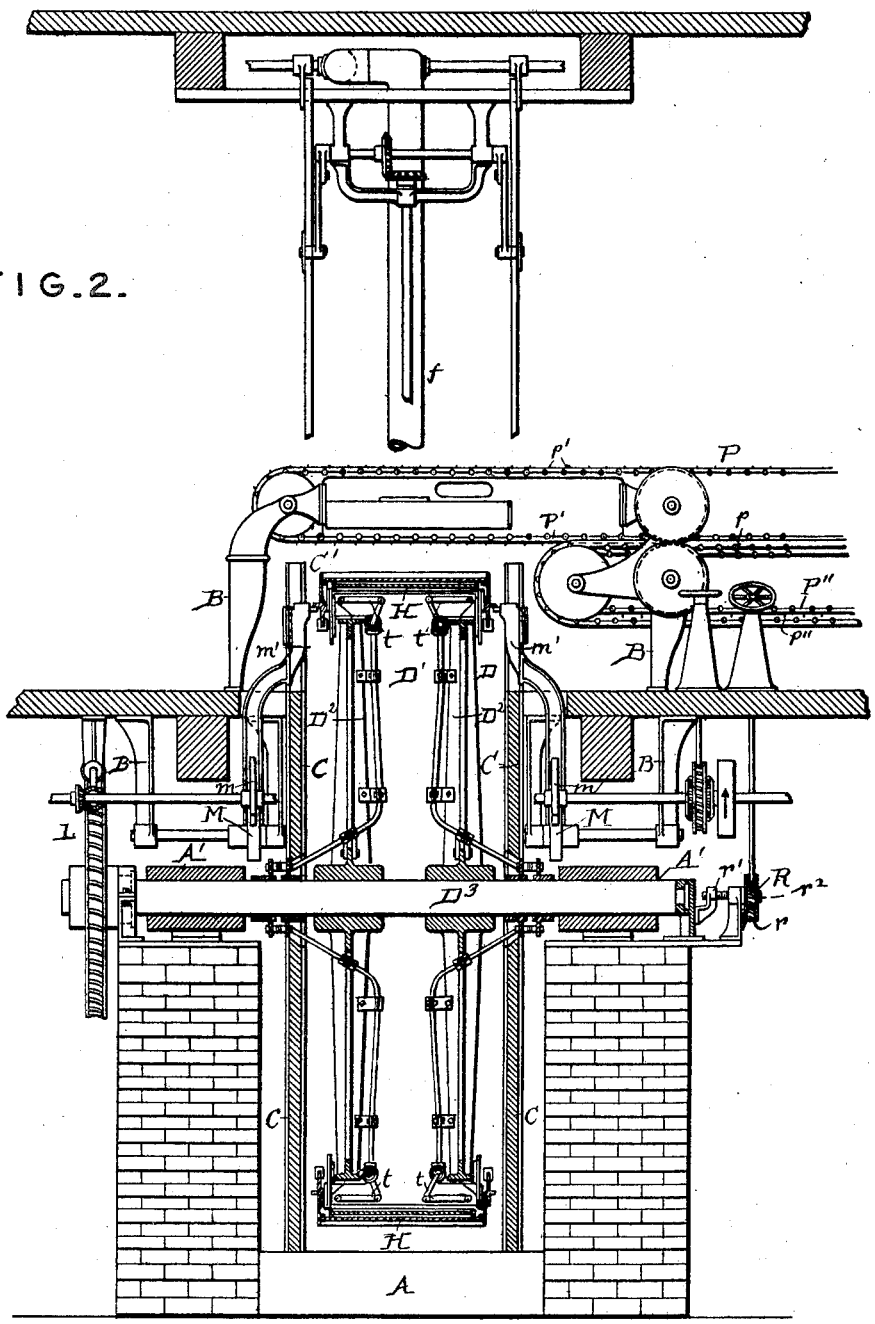
Figure 8:
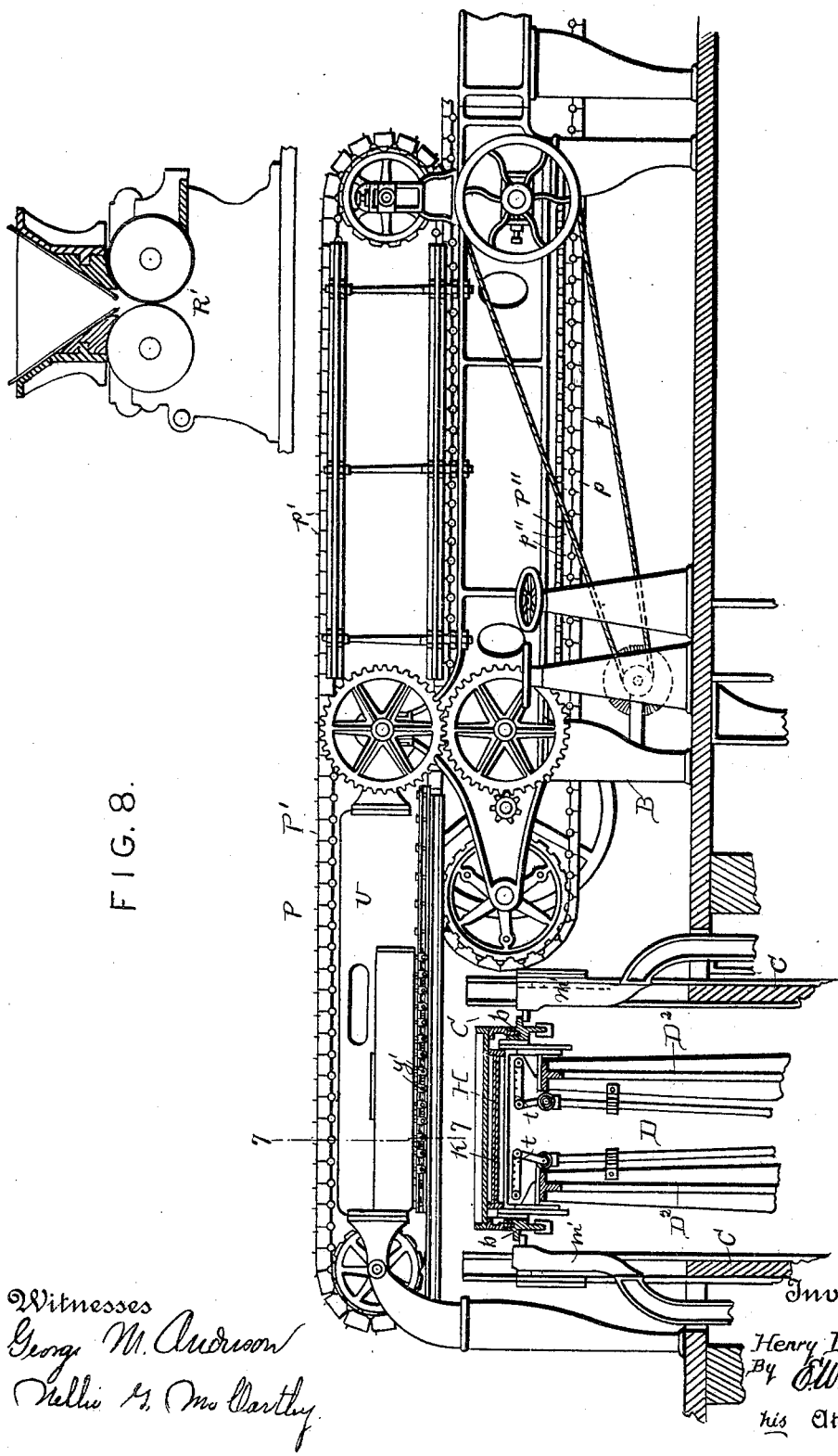

Figure 1 is a side elevation of my invention, partly broken away and partly diagrammatic. Fig. 2 is a section on the line 2 2, Fig. 1, parts of the mechanism being broken away. Fig. 3 is a side elevation of the upper part of the cooking devices, partly broken away, and of the swinging arm or frame S, two of the lower baking-irons being shown as raised in position to receive the biscuit and the pneumatic distributing-machine being shown in section. In this figure the belt or conveyer V is shown with its supporting-framework removed, and the lower part of the swinging frame S is indicated in dotted lines over said belt. Fig. 4 is a transverse section through the upper part of the oven, the lower baking-irons being shown as depressed. Fig. 5 is a similar fragmentary view enlarged. Fig. 6 is a detail view illustrating the operation of one of the gravity-latches Z. Fig. 7 is a section on the line 7 7, Fig. 8, the lower baking-iron H being shown. Fig. 8 is a side elevation of the pneumatic distributing-machine, the upper part of the oven being shown in section. Fig. 9 is a detail view illustrating the operation of valves $f'$.

The invention relates to mechanism for continuously cooking, heating, impressing, or otherwise acting upon articles, and it is designed for use chiefly in the preparation of biscuits, crackers, wafers, or other similar articles of food.

In the accompanying drawings, illustrating the invention, the letter A designates the flooring of a building wherein the mechanism is designed to be set up, such flooring being suitably strengthened in any ordinary manner.

B indicates the iron framework of the mechanism, and C the oven wall or shell which is designed to surround or inclose the rotary cylinder or endless baking or heating device D, except at the portion or portions where the charging and discharging operations are provided for by an opening or openings in said oven-wall, preferably at the top thereof, as indicated at $C'$. At various points the oven-wall should be provided with covered openings for purposes of inspection and repair. The oven may be heated by gas, jets being indicated at $t\,t$, or it may be heated by steam, electricity, or other means.

$D'$ represents the rotary cylinder, which may consist of circular iron wheels or frames $D^2$, secured to a strong shaft $D^3$ at a distance from each other suitable for the purpose, and usually between three and four feet when the diameter of said wheels is about twelve feet. The shaft of the cylinder is provided with bearings at $A'$ for its journal portions. The circumference of the cylinder is provided with a series of transverse stoves or holders, which have movement of radial reciprocation to a limited extent, sufficient, however, to provide for a rise and fall of each stove as it comes into the opening for charging or discharging. In the construction of the transverse stoves transverse plates J are provided, and to each plate J is secured a series of baking irons or receptacles, (indicated at H H.) These are the inner baking-irons or base receptacles of the stoves, on which the feeding or charging is effected. They may be formed integral with the plate J, if desirable. This plate J or the inner stove-section is provided at each end with a socket-arm $h$, which is designed to have a movement of radial reciprocation on a guide or way $a$ of the wheel when actuated by the operating block or head $b$, which is pivoted to an arm $k$, connected to the outer or cover stove-section K. The radially-reciprocating operating slides or heads $b$ move in connection with guides or ways $a'$ of the socket-arms $h$ of the inner stove-sections and are provided with lugs or projections $b'$ to engage the arm or connection $m'$ of a lever M, which is operated by means of a cam $m$ and serves to govern the motion of the stove-irons.

The outer or covering stove-section K consists of the transverse plate J' and the series of baking-irons K', attached thereto, or the baking-irons may be made integral with the transverse plate. In either case the plate is provided at its ends with arms $k$, which are pivoted to the operating-heads $b$, the pivots (indicated at $k'$) being eccentric or located at one side of the central radial plane of the outer stove-section in order that this outer or cover section shall, when raised above the inner stove-section, turn or rotate over to one side, so as to move and rest upon the next stove of the series in succession of the cylinder. In the construction illustrated the lateral movement is effected by gravitation, each stove acting in succession as a kind of cam or guide to provide for a gradual turning movement in the automatic opening of the preceding stove.

The movements of the stove-sections are effected, as hereinbefore stated, by means of a lever M, the arm or connection of which engages the operating-head $b$ on each side of the cylinder. The lever M is therefore usually a double lever or lever-frame, its branches embracing the cylinder, so that they can act on the operating heads or slides in unison. In this movement the operating heads or slides $b$ first raise the outer or cover section of baking-irons K until the limit of its movement above the lower section of baking-irons H is reached, when said lower section is raised through engagement with the lug $n'$, the cover-section of outer baking-irons moving over upon the next succeeding stove, as hereinbefore described. In this manner the lower section of baking-irons is uncovered and laid open to receive its charge of biscuits, crackers, or other material. In a similar way the irons of the discharging-stove are raised and uncovered, so that the cooked biscuits or other food may be transferred therefrom, leaving them empty and ready to receive a new charge. Usually this discharging-stove is arranged next but one to the charging-stove in the series, these two transverse stoves being in this manner separated by an intervening stove, but being nevertheless sufficiently close together to be operated by means of the lever M simultaneously. These stoves are designed to be in juxtaposition around the cylinder, their adjoining walls being slightly tapering or radially arranged, so that they have a mutual action, serving not only as cams or guides to facilitate the turning over of the cover-irons, but also acting to facilitate securing the cover-irons in closed position on the base-irons when the latter are brought to their seats and the cover-irons are automatically closed or drawn down upon them. A locking device is provided in connection with the operating-heads $b$ of the stoves in order to hold the latter closed when the cylinder is rotating in the oven-shell. This locking device may consist of a gravity-latch Z, (see Figs. 3 and 6,) adapted to engage the operating-head when the stove is in reversed position or liable to fall away from the cylinder. The latch may be disengaged by the lever M when the latter is in operation on said head.

The baking or heating cylinder is rotated by means of a worm and gear, (indicated at L,) the object being to give the cylinder a slow motion to allow time for heating or baking during the revolution of its peripheral stoves.

The feed is preferably effected by means of a pneumatic distributing-machine, (indicated at P.) In this feeding mechanism an endless belt or chain of trough-links $p$ $p$ is employed, these links being run between an upper cutter-chain P' and a lower cutter-chain P''. The links of these cutter-chains are provided with blades, as at $p'$ $p''$, which are brought together during the operation of the mechanism and serve to subdivide the material on the chain of trough-links into sections. The trough-links are separated by narrow intervals which are sufficient for the passage upward of the blades of the lower cutter-chain. The upper cutter-chain is composed of open links, which are adapted for suction purposes, each having a draft-passage $u$ and being provided with a wire-cloth or perforated bearing $u'$, covering the lower portion of such passage. The end of this cutting and suction belt passes under and around an exhaust-chamber U, which is provided with a series of openings $y$ $y$, arranged lengthwise in its bottom, the openings at the end portion of the series being provided with valves. These valves are designed to be operated by means of a series of circular cams Y Y, carried on a shaft Y', said cams engaging a series of pivoted arms O O, which engage said valves. The stems of the valves may be provided with springs $o$ to effect the reverse or return movements of the valves. The material fed by the trough-links being separated into sections by the cutters is taken up by the suction-links when the latter are under the exhaust-chamber, the trough-link chain then passing away from the work. The suction-chain carries the material to the valved portion of the exhaust-chamber, where the valves are opened one after the other to save the exhaust as much as possible. When a sufficient number of biscuits or food-sections are transferred along the valved portion of the exhaust-chamber to form a row and charge the receiver or stove, the valves are all closed at once by the cams shutting off the draft and permitting the row of biscuits or food-sections to drop in position on the receiver or stove-section below. As the motion of the stoves is transverse or at right angles to that of the feed, it is apparent that the charged stove will be easily moved away from the feed by the mechanism, which at the same time brings the succeeding stove into position and open to receive its charge. In this manner the biscuits or food-sections can be transferred over the uncovered base or inner stove-sections and dropped on said inner stove-sections, the rotation of the baking-cylinder providing for moving each charged stove out of the way of the feed in time for the succeeding stove-section to come into position to receive the next row of biscuits or food-sections.

In order to remove the cooked biscuits or crackers from the stove, which is opened for discharge in the manner hereinbefore indicated, an automatic transfer or discharging device is provided and preferably a transfer which is of pneumatic character. To this end a reciprocating or swinging arm or frame S is provided, having a suction-mouth s, covered with a perforated or wire-cloth guard s' and connected to a flexible tube f, which extends to a suitable exhaust. A valve f' (see Fig. 9) is arranged in connection with the tube to cut off the exhaust after the biscuits or crackers have been taken from the stove and transferred over the endless canvas belt or conveyer (indicated at V) in order that they shall drop on the conveyer. The movement of the pneumatic transfer corresponds to that of the baking-cylinder, being effected by mechanism at W, which is connected with that which moves the cylinder.

The baking-irons may be provided with knives or divider-blades, as at c', to separate the food material into sections, if desirable.

Usually the worm wheel or gear is constructed with one tooth for each stove of the baking-cylinder, so that one revolution of the worm-shaft will move the cylinder the distance of one stove. This shaft, being provided with a cam m, will actuate the lever M in unison with the movement of the baking-cylinder to give movement to the stoves. This worm-shaft is also connected by belts and pulleys to the drive-wheel of the endless feed, and on said worm-shaft may be provided an eccentric to move the discharging device or transfer at the proper times in unison with the motion of the devices which open the stoves. Cone-pulleys should be provided in connection with the belting in order to adjust the relative movements of the endless feed and endless baking device, a compound gear-regulating device, such as is indicated at R, being usually employed in combination with the shaft which communicates motion to the heating or baking cylinder for the ready adjustment of said cylinder. This regulating device consists of a worm-wheel r, having a shaft provided with a screw-threaded engagement with a bracket r', rigidly connected with the shaft of the heating-cylinder, whereby upon rotation of such worm-wheel through its worm $r^2$ such shaft, with its attached cylinder, is moved laterally to a slight degree for the purpose of regulating its position with relation to the feeding devices.

The material preferably employed is shredded grain, which may be reduced by suitable rollers (indicated at R') and fed to the chain of trough-links in a continuous manner.

Having described this invention, what I claim, and desire to secure by Letters Patent, is—

1. A rotary baking or heating cylinder having automatically opening and closing stoves and a peripheral feed, substantially as specified.

2. A rotary baking or heating cylinder having radially-reciprocating stoves, automatically opening and closing by the movements of reciprocation, substantially as specified.

3. A rotary baking or heating cylinder having radially-reciprocating stoves automatically opening and closing by the movements of reciprocation, and locking devices for holding the stoves closed when seated, substantially as specified.

4. A rotary baking or heating cylinder having a circumferential series of transverse radially-reciprocating stoves in juxtaposition with each other, substantially as specified.

5. In a rotary baking or heating cylinder, the combination with the circumferential transverse outer stove-sections and inner stove-sections of the radially-reciprocating operating blocks or heads pivoted to the outer stove-sections, and having a sliding connection with the inner stove-sections, substantially as specified.

6. The combination with a horizontally-journaled baking or heating cylinder, of an endless peripheral feed, and an automatic discharge, substantially as specified.

7. The combination with a continuous baking or heating device, of an endless pneumatic feed, a transfer or discharge, and an endless conveyer, substantially as specified.

8. The combination with a rotary baking or heating device, having transverse automatically opening and closing stoves, of an endless feed and a transfer or discharge, substantially as specified.

9. The combination with a continuous baking or heating device, having transverse automatically opening and closing stoves, of an endless pneumatic feed, a transfer or discharging device, and an endless conveyer in connection with said discharging device, substantially as specified.

In testimony whereof I affix my signature in presence of two witnesses.

HENRY D. PERKY.

Witnesses:
MAUD Y. ANDERSON,
BERTHA E. SUTTON.